United States Patent
Blondeau et al.

(10) Patent No.: US 7,242,639 B2
(45) Date of Patent: Jul. 10, 2007

(54) ALTIMETER WATCH

(75) Inventors: Fabien Blondeau, Le Landeron (CH);
Loïc Talbot, Nidau (CH);
Claude-Alain Giauque, Prêles (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 11/530,516

(22) Filed: Sep. 11, 2006

(65) Prior Publication Data
US 2007/0068245 A1  Mar. 29, 2007

(30) Foreign Application Priority Data
Sep. 13, 2005 (EP) .................. 05108410

(51) Int. Cl.
*G04B 47/06* (2006.01)
*G01L 7/20* (2006.01)
*G01L 9/00* (2006.01)

(52) U.S. Cl. .................. 368/11; 73/384; 73/714; 73/753

(58) Field of Classification Search .................. 368/10, 368/11, 80, 223; 73/37, 291, 384, 714, 753
See application file for complete search history.

(56) References Cited

U.S. PATENT DOCUMENTS 3,696,610 A * 10/1972 Charbonnier .................. 368/1
4,835,716 A 5/1989 Tamaki et al.
5,251,190 A * 10/1993 Miyasaka et al. .............. 368/10
5,440,527 A * 8/1995 Okamoto ...................... 368/80
5,519,671 A * 5/1996 Murakami et al. ............ 368/10
5,583,830 A * 12/1996 Okuyama ..................... 368/11
5,671,162 A 9/1997 Werbin
6,385,134 B1 * 5/2002 Lange et al. .................. 368/11
6,842,402 B2 * 1/2005 Germiquet et al. ......... 368/110

FOREIGN PATENT DOCUMENTS

EP  1 061 334 A2  12/2000
EP  1 180 663 A2  2/2002
EP  1 396 766 A1  3/2004

OTHER PUBLICATIONS

European Search Report issued in corresponding application No. EP 05 10 8410 completed Apr. 27, 2006.

* cited by examiner

*Primary Examiner*—Vit W. Miska
(74) *Attorney, Agent, or Firm*—Griffin & Szipl, P.C.

(57) ABSTRACT

The invention concerns a method allowing an electronic watch to automatically exit an altimeter mode including the following steps: (a) entry into altimeter mode by activating the watch altimeter module; (b) using a pressure sensor of the watch to measure at least one first pressure value used to calculate a first altitude value; (c) using the pressure sensor to measure at least one second pressure value used to calculate a second altitude value; (d) comparing the difference between said first and second pressure or altitude values to a determined pressure or altitude variation threshold using a variation detector of the altimeter module; (e) automatic exit from the altimeter mode when the result of the comparison is higher than the determined pressure or altitude variation threshold and stopping the display of altitude values by the analogue display means.

12 Claims, 7 Drawing Sheets

ALTIMETER WATCH

This application claims priority from European Patent Application No. 05108410.1, filed Sep. 13, 2005, the entire disclosure of which is incorporated herein by reference.

FIELD OF THE INVENTION

The present invention generally concerns an electronic watch with an altimeter function. The invention more specifically concerns a watch comprising a pressure sensor for measuring the external pressure, an altimeter module for calculating altitude values as a function of the measured pressure values and analogue means for displaying the calculated altitude values.

BACKGROUND OF THE INVENTION

There is known from the prior art, in particular from EP Patent No. 1 396 766 A1, an electronic analogue display dive watch wherein the current time display hands are also used for displaying dive-related data and in particular the instantaneous depth of the diver. The watch includes for this purpose a pressure sensor for measuring the external ambient pressure, a depth gauge module for calculating the diver's depth as a function of the pressure measurements taken and displaying the calculated depth using one of the hands of the watch.

In the same manner, one could envisage replacing the depth gauge module with a module for calculating an altitude value on the basis of the pressure measurements taken and displaying this calculated altitude by the analogue means of the watch.

However, this kind of altimeter watch has certain drawbacks depending upon the use to which it is put. Indeed, typically during swimming activity, the person wearing the watch regularly moves his arm in and out of the water. Thus, if the altimeter mode is activated, the pressure values measured by the sensor vary greatly each time the medium changes between the air and water. Given that the pressure variation observed when one plunges 10 centimeters into water corresponds approximately to an altitude variation of 100 meters in the air, this type of swimming activity where the swimmer's arm plunges several tens of centimeters into the water with each movement, means that the altitude indication varies by several tens of meters with each of such movements. The analogue display means, although generally attractive and easy to read for the person wearing the watch, in this case have the drawback of having to follow significant altitude variations which results in large movements of the indicator means, such as for example a hand, between a first position corresponding to the real altitude at the water surface and a second position corresponding to an erroneous much lower altitude when the swimmer's arm is underwater. Taking as an example a swimmer swimming in a lake situated at an altitude of 400 meters and a swimming movement periodically taking the swimmer's arm to a depth of 40 centimeters underwater, the analogue altitude indicator will constantly move between the graduations indicating 400 meters (i.e. arm at the surface) and 0 meters (i.e. arm underwater). It would be intolerable for the altimeter mode to operate in this manner. Indeed, on the one hand, the user might doubt that his watch worked properly, given the large movements of the analogue altitude display means in the altimeter mode and, on the other hand, since the analogue display means are controlled by a motor, their jumping back and forth would result in excessive power consumption which is never desirable in a portable instrument.

SUMMARY OF THE INVENTION

It is one of the main objects of the present invention to overcome the aforementioned drawbacks by implementing a method for automatic exit from the altimeter mode when the mode is used inadvertently. The invention also concerns an electronic altimeter watch for implementing this method.

Therefore, according to a first aspect, the present invention therefore concerns a method allowing an electronic watch to automatically exit the altimeter mode including the following steps:

a) entry into altimeter mode by activating the watch altimeter module;

b) using a pressure sensor of the watch to measure at least one first pressure value used to calculate a first altitude value;

c) using the pressure sensor to measure at least one second pressure value used to calculate a second altitude value;

d) comparing the difference between said first and second pressure or altitude values to a determined pressure or altitude variation threshold, using a variation detector of the altimeter module;

e) automatic exit from the altimeter mode when the result of the comparison is higher than the determined pressure or altitude variation threshold and stopping the display of altitude values by the analogue display means.

According to a preferred implementation of this method, the pressure value measurements and altitude value calculations of steps b) and c) are repeated at a determined sampling frequency, step d) consists of the following two sub-steps:

d1) comparing the difference between a previously calculated altitude value to the penultimate altitude value and comparing the latter to a determined altitude variation threshold; and d2) comparing the difference between said previously calculated altitude value to the penultimate calculated altitude value and the last calculated altitude value to the same determined altitude variation threshold;

and step e) consists in automatically leaving the altimeter mode when the result of the two differences carried out at d1) and d2) is higher than the determined altitude variation threshold and stopping the display of altitude values by the analogue display means.

It is also possible to use a pressure filter such that the calculation of each altitude value is based on at least two previously measured pressure values.

According to a second aspect, the present invention also concerns an electronic altimeter watch including a pressure sensor, an altimeter module calculating, in altimeter mode, altitude values from pressure values measured by said pressure sensor and analogue display means for displaying the calculated altitude values, characterised in that said altimeter module includes a variation detector comparing the difference between defined pressure or altitude mean values to a determined pressure or altitude variation threshold, and further comprising mode selection means controlled by the output of the variation detector to automatically exit the altimeter mode and stop the display of altitude values by the analogue display means.

Advantageously, the altimeter module further comprises a pressure filter, or respectively and altitude filter, supplying mean pressure or respectively altitude values to the variation detector.

BRIEF DESCRIPTION OF THE DRAWINGS

Other features and advantages of the present invention will appear more clearly upon reading the following detailed description of embodiments of the invention given solely by way of non-limiting example and illustrated by the annexed drawings, in which.

DETAILED DESCRIPTION OF THE INVENTION

Figure 1:
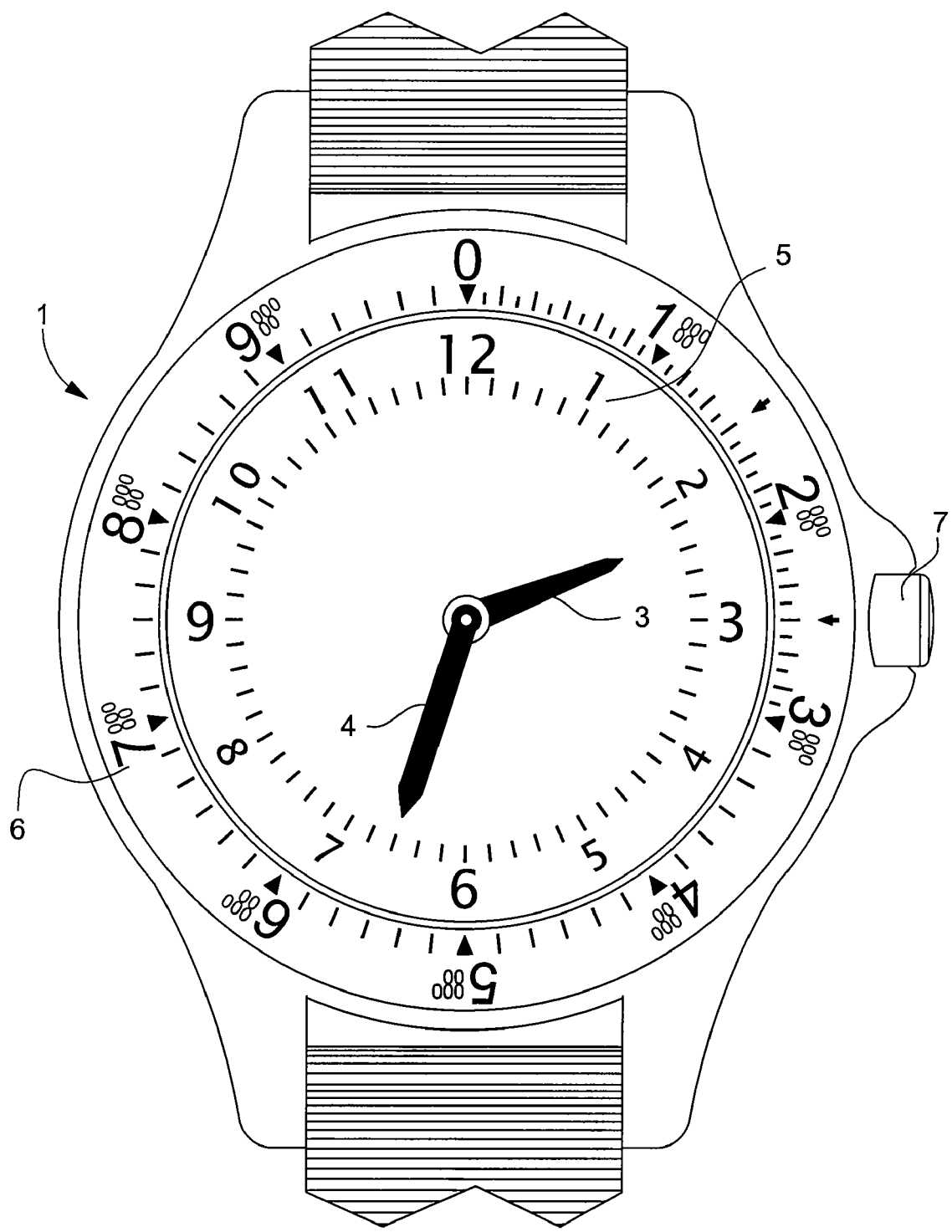
FIG. 1 is a face view of the altimeter watch according to a preferred embodiment of the invention.

The description that follows is provided solely by way of example. FIG. 1 shows a face view of an altimeter watch 1 used in its altimeter mode in accordance with an embodiment of the invention. As can be seen in this Figure, the dial 2 of the watch includes analogue display means, formed for example of an hour hand 3 and a minute hand 4 for providing, in the display mode of the watch, a time indication by pointing to the inner graduation 5 of the dial. The watch further comprises a second graduation 6 arranged on the bezel of the watch. This graduation used in the altimeter mode (shown here) includes altitude indications from 0 to 9990 meters. The display is preferably arranged in the following manner. When the altitude to be displayed is less than 1000 meters, the two hands are then superposed and placed facing the graduation corresponding to that altitude. When the altitude is higher than or equal to 1000 meters, as in the example shown where the altitude to be displayed is 2550 meters, one of the hands, for example hour hand 3, is placed opposite the 2000 meter numerical graduation and the other hand, here minute hand 4, is placed opposite the graduation corresponding to the rest of the altitude, i.e. 550 meters. This different display technique depending upon whether the altitude is less than 1000 meters, or conversely higher than 1000 meters, has the advantage of being very clear and easy to read for the user whatever altitude has to be displayed over a large altitude range (0 to 9990). It should be noted that the risk of confusion that could arise between the indication of an altitude of 100, 200, 300 meters and an altitude of 1100, 2200, 3300 is small given that the user is aware whether he is close to sea level (100, 200, 300 . . . ) or in the mountains (1100, 2200, 3300 . . . ). Of course, the role of the two hands can be reversed, even if it is preferable for the indication provided by the hour hand to be larger than that provided by the minute hand as is the case when they display the current time.

The watch further comprises a control member 7 for switching between the time and altimeter modes. This control member 7 can be implemented in multiple ways, of which there will be mentioned in particular, a stem-crown as shown, a push-button, a touch type crystal or even shock detection on the case by means of an accelerometer.

Figure 2:
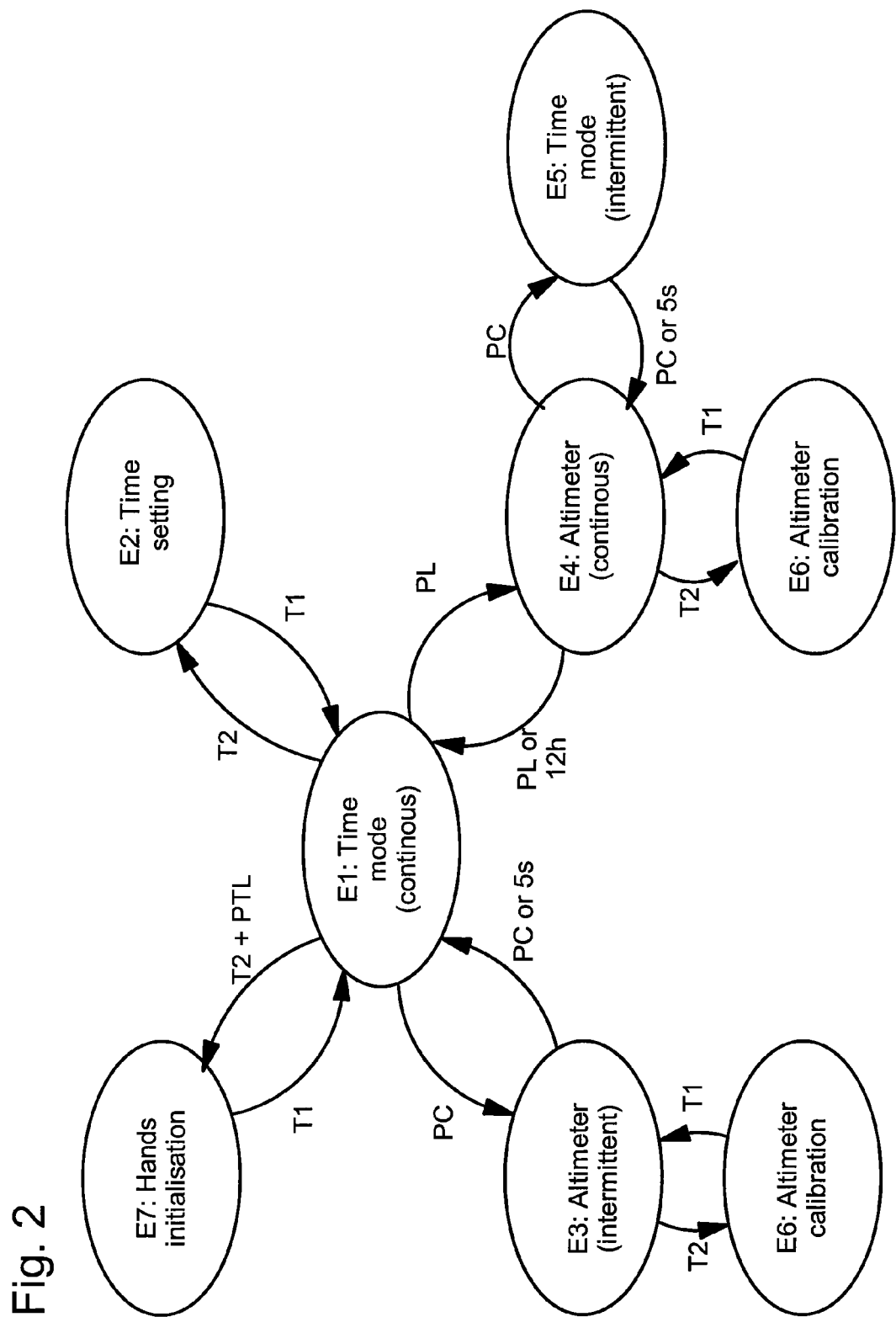
FIG. 2 shows a diagram of the operating state of the time and altimeter modes by means of the control member(s) of the watch.

FIG. 2 shows a diagram of the operating state of the time and altimeter modes by means of the control member(s) of the watch. For the sake of simplification of the description of FIG. 2, the control member considered is a stem-crown, however combinations of other control members could also be envisaged.

The current state E1 or initial state, is the time mode in which the watch provides the user with a time indication, by means of the hands, with the stem-crown in a first non-pulled out position T1. From this time mode, it is possible, in a conventional manner, to provide a second pulled out position T1 of the stem-crown in which the user can adjust the time indication by rotating the stem-crown which drives the hands. The time setting mode of the watch corresponds to state E2 in the Figure. The watch returns to the initial state E1 or time mode by repositioning the stem-crown in its non-pulled out position T1. Again from the initial state E1, i.e. the time mode, a short application of pressure (PC) on the stem-crown activates an intermittent altimeter mode of the watch (state E3) in which the watch provides an altitude indication for a short determined time period and then returns to state E1 when this time period has elapsed or following another application of pressure on the stem-crown (PC or 5 seconds). By way of example, a short application of pressure means less than 2 seconds, and the short time period before the return to time mode will be fixed at 5 seconds. Still considering the watch in initial state E1 (time mode), a long application of pressure (PL) on the stem-crown activates a continuous altitude mode of the watch (state E4) in which the watch provides an altitude indication for a long determined period of time, much higher than that of the intermittent altitude mode. The watch returns to the time mode (state E1) either after this long determined period of time has elapsed, or after another long application of pressure on the stem-crown (PL or 12 hours). By way of example, a long application of pressure means of a length comprised between 2 and 5 seconds, and the long period of time before the return to time mode will be fixed at 12 hours. A short application of pressure (PC) on the stem-crown from state E4 activates an intermittent time mode (state E5) in which the watch provides a time indication for a short period of time, for example 5 seconds, or until another short application of pressure (PC or 5 seconds) on the stem-crown before returning to the continuous altitude mode (state E4). Positioning the stem-crown in its pulled out position T2 from the intermittent (state E3) and continuous (state E4) altimeter modes causes entry into an altimeter calibrating mode (state E6) in which it is possible to adjust the altitude displayed by rotating the stem-crown. It should also be noted that a very long application of pressure (PTL) on the stem-crown from the time mode (state E1) is preferably recognised as entry into a hand reset mode (state E7) for resetting the hands by positioning the stem-crown in its pulled out position T2 then rotating the stem-crown. Return to the time mode is achieved by repositioning the stem-crown in its non-pulled out position T1.

Figure 3:
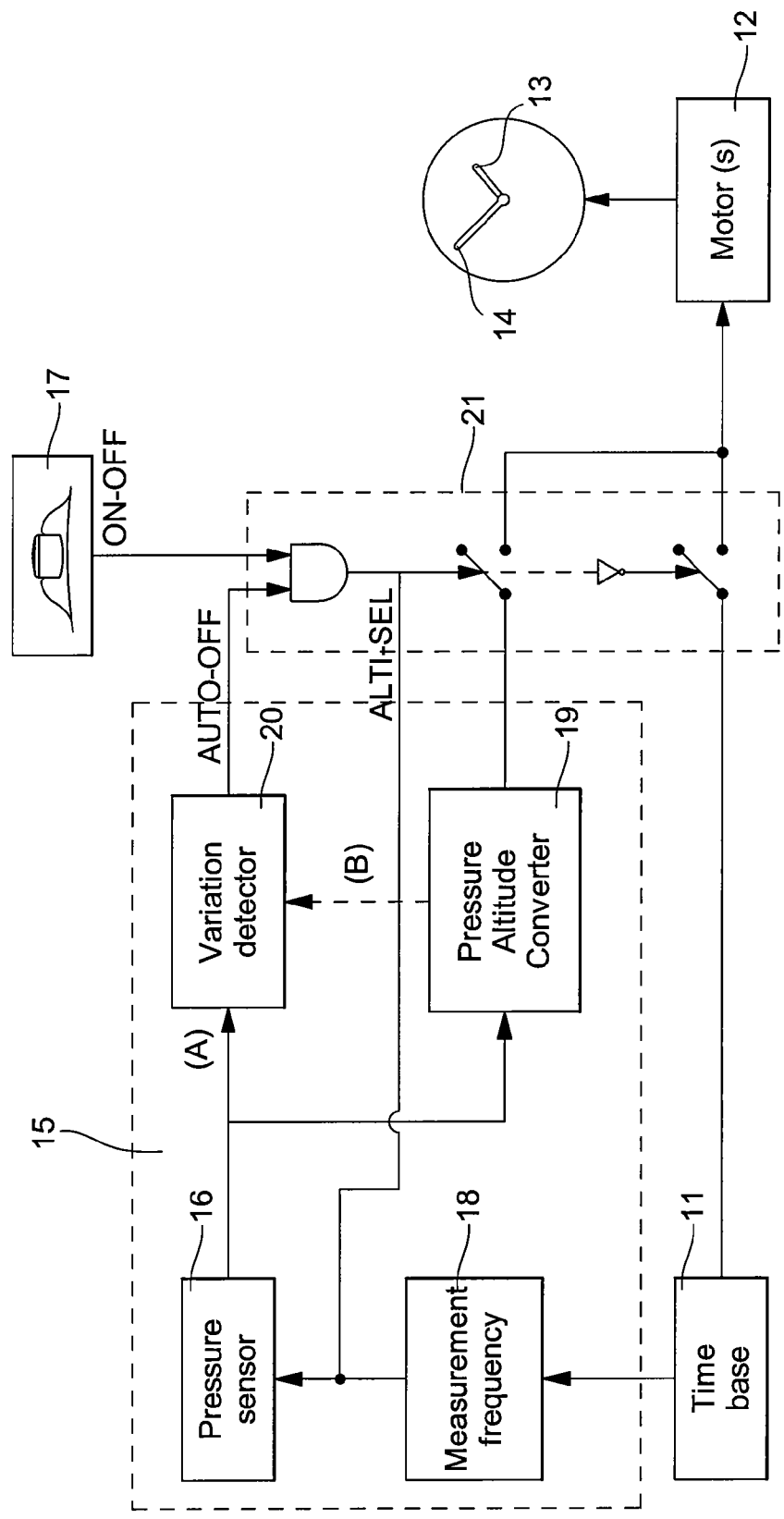
FIG. 3 is a block diagram of an electronic circuit of the watch.

FIG. 3 shows, in the form of a block diagram, an example of an electronic circuit of the altimeter watch in accordance with an embodiment of the invention. In the time mode, the time base 11 of the watch controls the forward movement of the motor(s) 12 driving hands 13 and 14 which then display time-related information. Activating a control member 17 switches the watch from the time mode to the altimeter mode or vice versa. As previously mentioned, any type of control member can be envisaged. Mode selection means 21 are provided for selectively activating/deactivating the altimeter mode (ALTI_SEL) and the time mode. These selection means 21 are simply represented here in the form of a logic gate placed upstream of two switches and a inverter, but any other suitable electro-mechanical device could be provided by those skilled in the art. The altimeter module 15 is activated by passage into the altimeter mode. This altimeter module 15 includes a pressure sensor 16 which measures the external ambient pressure, a frequency sampling unit 18 for the pressure measurements to be taken controlled by the time base of the watch, a pressure-altitude converter 19 which calculates the altitude values on the basis of the pressure measurements taken, and a variation detector 20 which allows the watch to exit the altimeter mode when the pressure variation (path A), or according to an alternative, the altitude variation (path B), exceeds a determined variation threshold. Variation detector 20 can be implemented, for example, in the form of a subtracter receiving either two pressure values (path A) or two altitude values (path B) followed by a comparator with a pressure variation threshold (path A), or respectively an altitude variation threshold (path B). More generally, the variation detector 20 can be implemented in the form of a logic circuit or a logic equation programmed in a microcontroller comparing the evolution of one function of the pressure measurements taken between two determined time intervals with a determined variation threshold homogenous to the result of that function. When the result of the comparison carried out by variation detector 20 requires automatic exit from the altimeter mode, the latter then sends an automatic stop signal (AUTO_OFF) to the input of the mode selection means 21. The ALTI_SEL signal is then deactivated which enables the watch to automatically exit the altimeter mode, and the analogue display means are then switched into time mode.

The operation of the altimeter mode will now be described in detail in relation to a first method of automatic exit from the altimeter mode with reference to FIG. 4 and a second method of automatic exit from the altimeter mode will be described in relation to FIGS. 5a–5d and 6a–6c.

Figure 4:
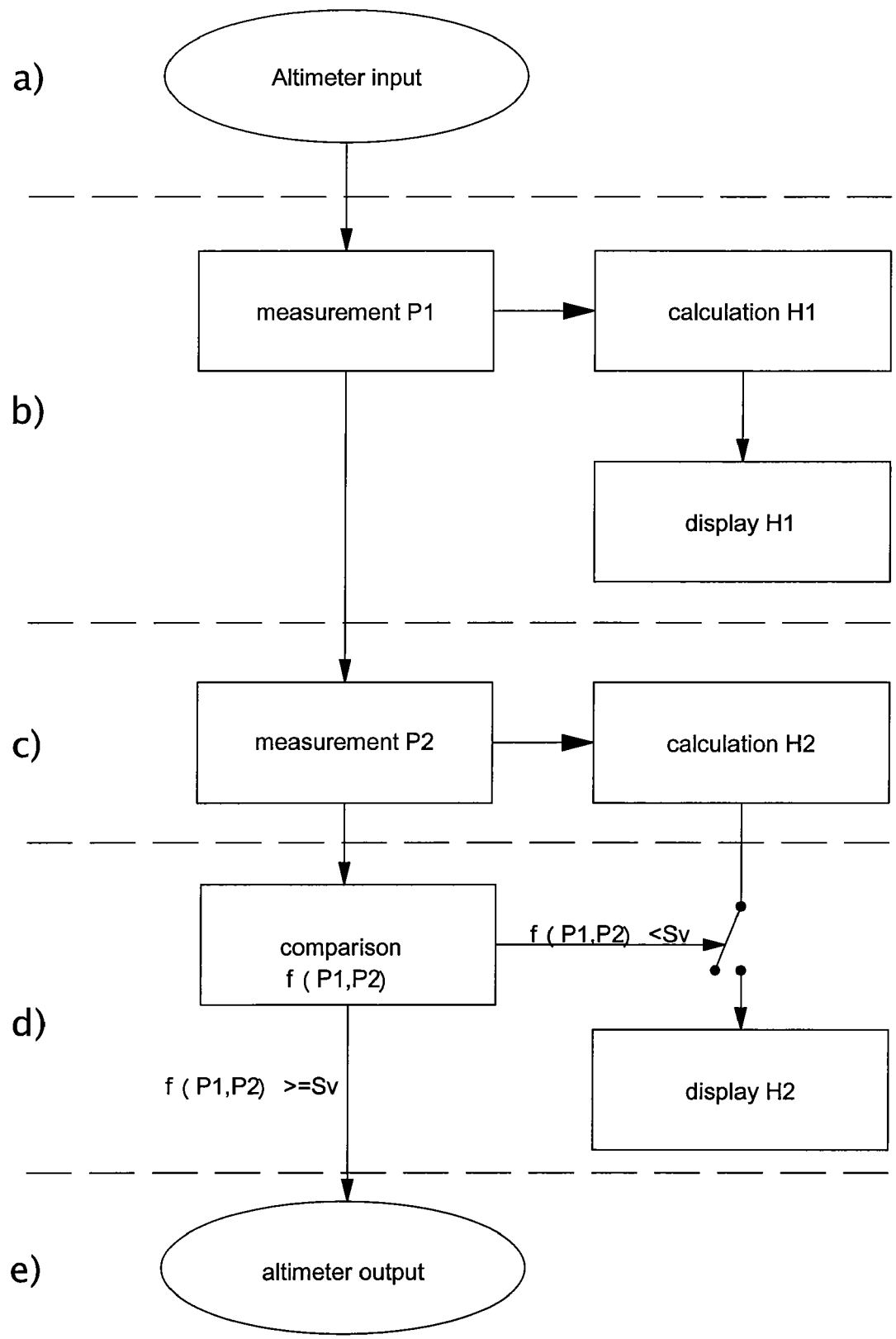
FIG. 4 is a diagram showing the steps of a first method of exiting the altimeter mode.

FIG. 4 shows a first simplified method of automatic exit from the altimeter mode. In this example, the sampling frequency is chosen to be 1 Hertz, i.e. one pressure measurement per second. In order for the pressure-altitude converter to calculate the altitude values, the following formula could be used:

$$H=153.85 \times T_0 \times [1-(P/P_0)^{0.190255}] \quad (1)$$

wherein, $T_0=228.15$ K=15° C., P represents the barometric ambient pressure and $P_0=1013.25$ mbar at sea level. The above equation is defined at a temperature variation rate of $-6.5°$ C./1000 m, i.e. a temperature drop of 6.5° C. for any altitude increase of 1000 m.

When the control member of the watch is activated, the latter returns to the altimeter mode (step a). Entry into altimeter mode activates altimeter module 15. The measurement frequency sampling unit 18, clocked by time base 11 of the watch, controls the pressure sensor 16 so that the latter takes a pressure measurement at the desired frequency, here 1 Hz. At step b), a first pressure measurement is taken, the measured pressure value P1 is provided to the pressure-altitude converter 19 which calculates the altitude value H1 corresponding to the measured pressure value. The calculated pressure value H1 can then be displayed by the analogue display means 13 and 14 for an altitude value. At step c), a second pressure measurement is taken, the measured pressure value P2 is provided to pressure-altitude converter 19, which calculates a second altitude value H2.

According to the alternative represented by path A in FIG. 3, the two measured pressure values P1 and P2 are supplied to the variation detector 20, which compares (step d) the difference of these two values (P2–P1) with a determined pressure variation threshold ($S_{VP}$) beyond which (P2–P1$\geq S_{VP}$) it is deemed that the altimeter is not being used in realistic conditions and the watch then automatically exits the altimeter mode (step e). According to the alternative represented by path B in FIG. 3, the two calculated altitude values H1 and H2 are supplied to variation detector 20 which compares the altitude difference (H1–H2) with a determined altitude variation threshold ($S_{VH}$) beyond which (H1–H2>$S_{VH}$) the watch automatically exits the altimeter mode (step e). In both alternatives, it is advantageous to choose a variation threshold ($S_{VP}$, $S_{VH}$) that is higher than the threshold value of a man in freefall. Thus, for example, on path B, it is advantageous to select $S_{VH}$=100 meters for a sampling frequency of 1 Hertz, i.e. a threshold corresponding to a fall of 100 m per second, which is higher than the speed of a man in free fall. For the case in which the pressure variation (P2–P1), or respectively the altitude variation (H1–H2) is less than pressure variation threshold $S_{VD}$, or respectively altitude variation threshold $S_{VH}$, the calculated altitude H2 is displayed and another pressure measurement P3 is made, another corresponding altitude H3 value is calculated and the comparison step d) is then carried out with the last two measured pressure values P2 and P3, respectively with the last two calculated altitude values H2 and H3. It will be noted, alternatively, that it is also possible to compare the absolute value of the pressure variation (path A), respectively of the altitude variation (path B), with the pressure or respectively altitude variation threshold.

By way of variant of this first method, it is possible to compare non-consecutive pressure or altitude values. It is advantageous to compare two altitude values separated by 3 seconds with an altitude variation threshold $S_{VH}$ fixed at 300 meters.

According to another variant, is advantageous to use a "pressure filter", the pressure sensor containing a circular buffer of the last three measured pressure values to define a mean pressure value. Alternatively, a circular buffer of the last three calculated altitude values could be used.

Figure 5A:
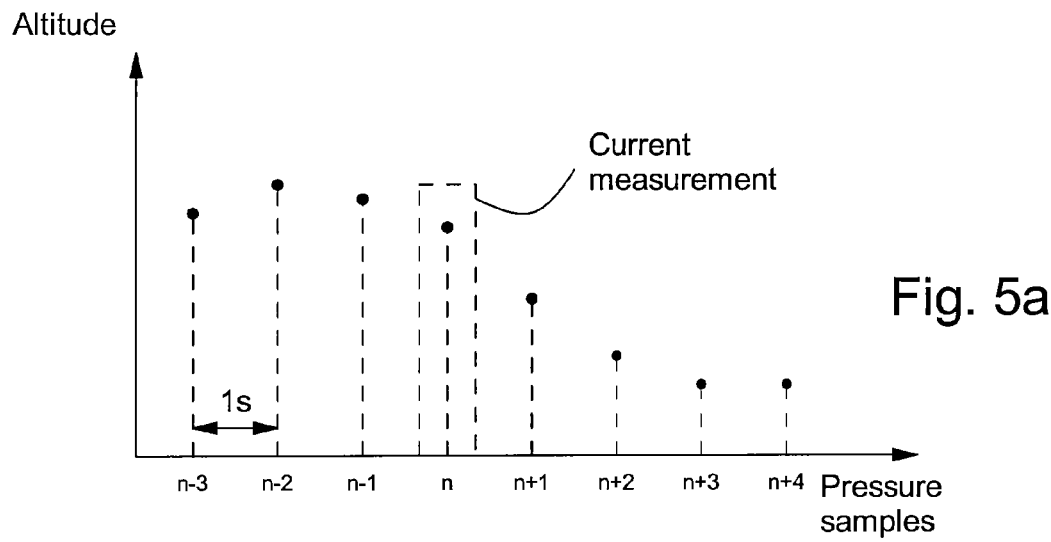
FIGS. 5a–5d show a first example of exiting the altimeter mode according to a second preferred method of exiting the altimeter mode.

FIGS. 5a to 5d show a second preferred method of automatic exit from the altimeter mode, for exit in a maximum of three seconds in the event of altitude variations that are deemed excessive or unrealistic. FIG. 5a shows the pressure measurement samples and the corresponding altitudes calculated by the pressure-altitude converter. In this example, the sampling frequency is also chosen to be equal to 1 Hertz. According to this second method, a "pressure filter" is advantageously used in that the pressure sensor contains a circular buffer containing the last three pressure measurements (n, n–1 and n–2), on the basis of which the pressure sensor transmits a means pressure value to the pressure-altitude converter, given by the following formula:

$$Pn=[n+(n-1)+(n-2)]/3 \quad (2)$$

On the basis of formula (1), the pressure-altitude converter then calculates a filtered altitude dependent on the mean value of the last three pressure measurements according to formula (2). The use of this pressure filter has the advantage, as will be described in detail hereinafter, of not automatic exit from altimeter mode as soon as the first measured pressure value is beyond a certain threshold. Alternatively, one could envisage the use of an "altitude threshold" using the altitude displayed by the last three altitudes calculated from formula (1).

Figure 5B:
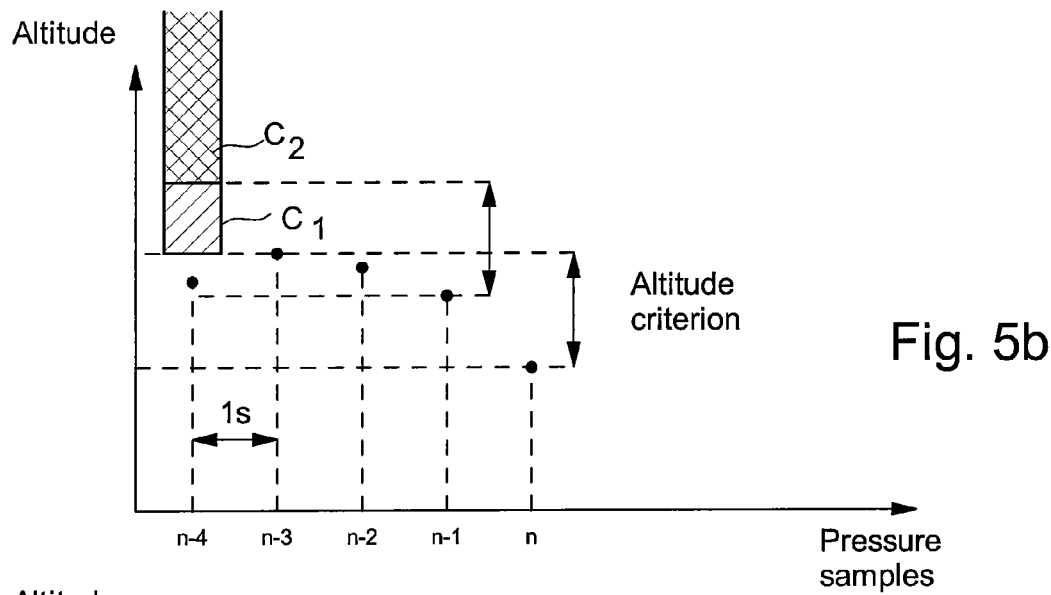

FIG. 5b shows a first "non-trigger" measurement sample, i.e. for which the filtered altitude value does not automatically trigger the watch to exit the altimeter mode. FIG. 5b shows the 5 pressure samples (n, n–1, n–2, n–3 and n–4) which correspond to the 5 filtered altitudes (hn, hn–1, hn–2, hn–3 and hn–4) calculated on the basis of the preceding pressure measurements according to formulae (1) and (2).

The object of variation detector 20 is to check whether the altimeter mode has to remain active as a function of the detected variations in altitude or pressure. In the event of variations that are too great within a given time period, the detector sends a signal to automatically exit the altimeter mode.

In order to do this, two conditions are advantageously checked for each sample, i.e. every second in this example. The use of a dual condition proves very advantageous, since it prevents the watch inadvertently exiting the altimeter mode, which could occur for example when the user washes his or her hands, since the sensor could then be briefly exposed to a water spray, or even if the sensor is suddenly exposed to a large air flux, for example when the user drives a motorcycle, or puts his or her hand out of the window of a fast moving car.

The first condition, represented by the open rectangle c1, consists in checking whether the last calculated altitude value hn is lower than the altitude value hn–4 calculated four seconds earlier, from which a defined altitude criterion is subtracted. Thus, the first condition can be expressed as follows:

$$hn < (hn-4-\text{"altitude criterion"}) \quad (c1)$$

The second condition, represented by the open rectangle c2, consists in checking whether the penultimate altitude value hn–1 is less than the altitude value hn–4 calculated three seconds earlier, from which the defined altitude value is subtracted. This second condition can be expressed as follows:

$$Hn-1 < (hn-4-\text{"altitude criterion"}) \quad (c2)$$

Given that in accordance with this second method, one wishes to exit the altimeter mode in three seconds maximum from detection of an excessive altitude variation, the altitude criterion is selected to be greater than the possible altitude variation of a man in freefall, for example during a parachute jump prior to opening the parachute, during this three second period. This criterion is preferably chosen to be 300 meters. Thus, the watch is sure to automatically exit the altimeter mode with a minimum altitude variation of 300 meters in 3 seconds (condition c2). It should also be noted that the two conditions c1) and c2) respectively compare the last (hn) and penultimate (hn–1) calculated altitude values with the same previously calculated altitude value (hn–4), which prevents the watch inadvertently exiting the altimeter mode, while allowing efficient detection of any unsuitable use requiring the watch to exit the altimeter mode.

It can be seen in FIG. 5b that neither of the two conditions c1 and c2 has been fulfilled, indeed as the altitude value hn–4 is outside the two rectangles c1 and 2c, the defined altitude criterion has not been exceeded.

Figure 5C:
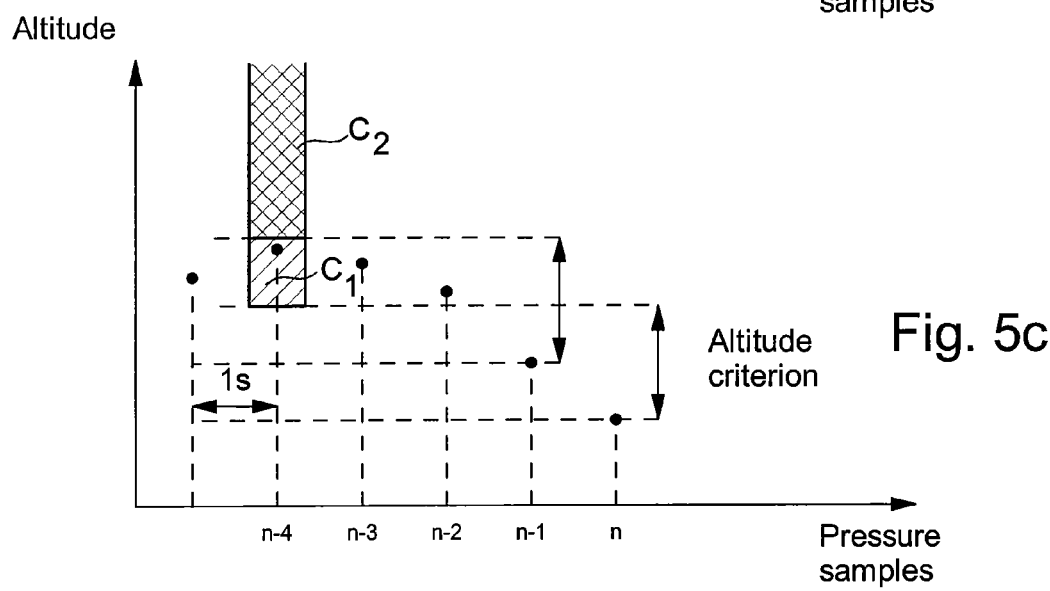

FIG. 5c shows the case of an intermediate sample where only the first condition c1 is fulfilled. In the example shown, the user of the watch has probably entered the water since the last altitude value hn corresponding to the last pressure sample n taken, is already considerably lower than the preceding altitude value hn–1, previously altitude value hn in FIG. 5b. However, because of the pressure filter, the value obtained does not satisfy the second condition c2. Indeed, as is clearly visible by means of rectangles c1 and c2, altitude value hn–4 is within rectangle c1 and thus the first condition is fulfilled, however, this same altitude value hn–4 is outside rectangle c2 and thus the second condition is not fulfilled. Consequently, the watch remains in the altimeter mode.

Figure 5D:
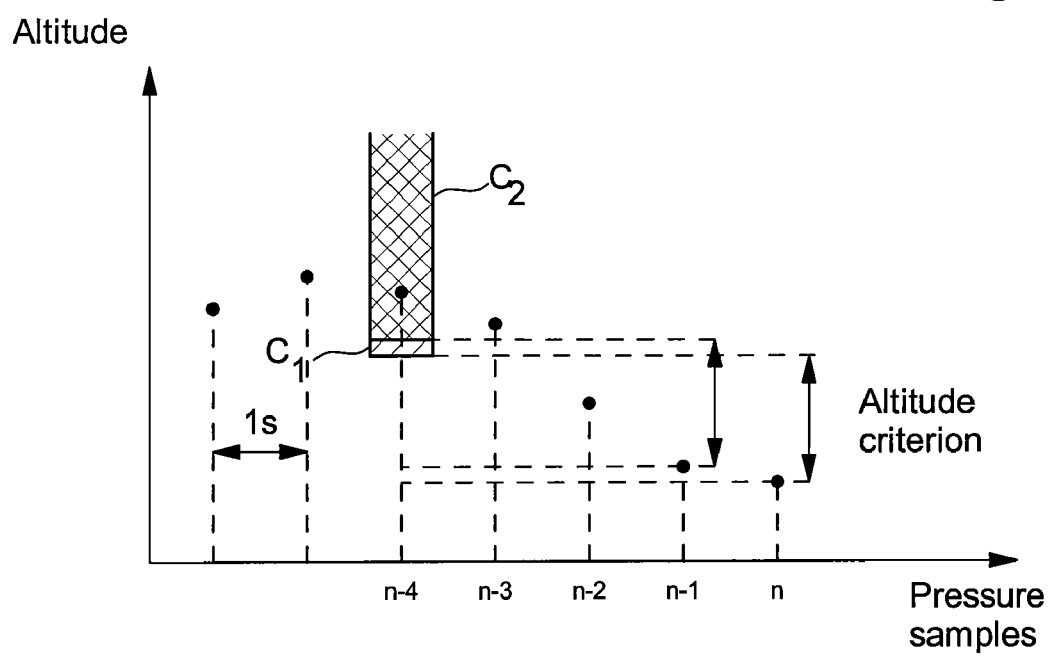

FIG. 5d shows a sample for which both conditions are fulfilled which causes the watch to exit altimeter mode. In FIG. 5d, the user is probably still underwater, thus the second pressure value corresponding to an unrealistic altitude value is measured. Since the pressure filter takes account of the last three pressure measurements, its filtering effect is reduced with two high pressure values out of three. Once again, rectangles c1 and c2 show the two conditions to be checked. As can be seen, value hn–4 is not only in rectangle c1, but also in rectangle c2. Thus, both conditions are fulfilled, i.e. the altimeter has detected an altitude variation higher than that of freefall, greater than 300 meters in 3 seconds in the particular example shown here. Consequently, the variation detector automatically sends an altimeter mode exit signal in order to prevent the hands displaying improbable variations which would mislead the user. 3 seconds have thus passed between the first unrealistic/excessive pressure measurement and exiting the altimeter mode.

Figure 6A:
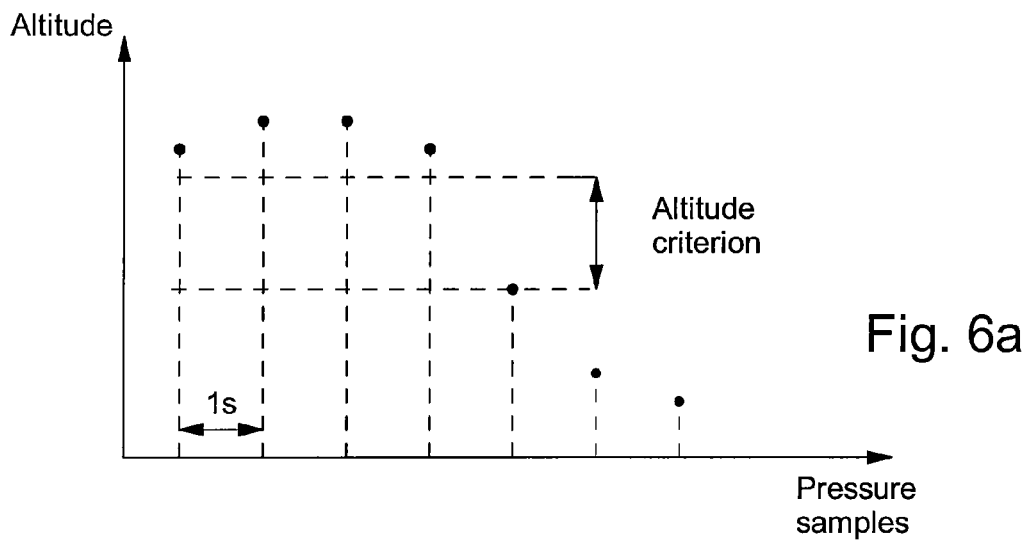
FIGS. 6a–6c show a second example of exiting the altimeter mode according to the second preferred method of exiting the altimeter mode.

FIGS. 6a to 6c again show, in accordance with the second automatic exit method, an anticipated exit example due to a very abrupt pressure or altitude variation. FIG. 6a shows the profile of the altitude calculated as a function of the pressure samples taken. The zone framed in dotted lines shows the moment at which the pressure measurements abruptly change. This variation occurs for example if the user dives into the water, or if the measurement preceding the variation was taken at the surface and the following measurement is taken at a certain depth underwater.

Figure 6B:
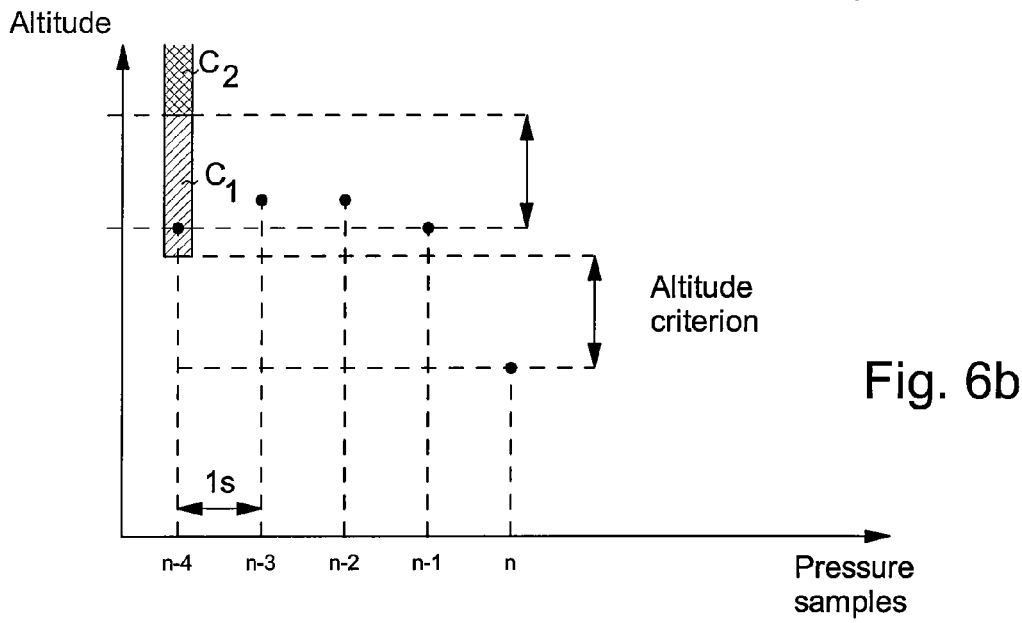

FIG. 6b shows the first sample after the abrupt pressure variation. The same two conditions c1 and c1 as previously are used. The first condition c1 is fulfilled, since the altitude value hn–4 is in rectangle c1. The second condition c2 is evidently not fulfilled given that it does not yet take account of the last calculated altitude value hn.

Figure 6C:
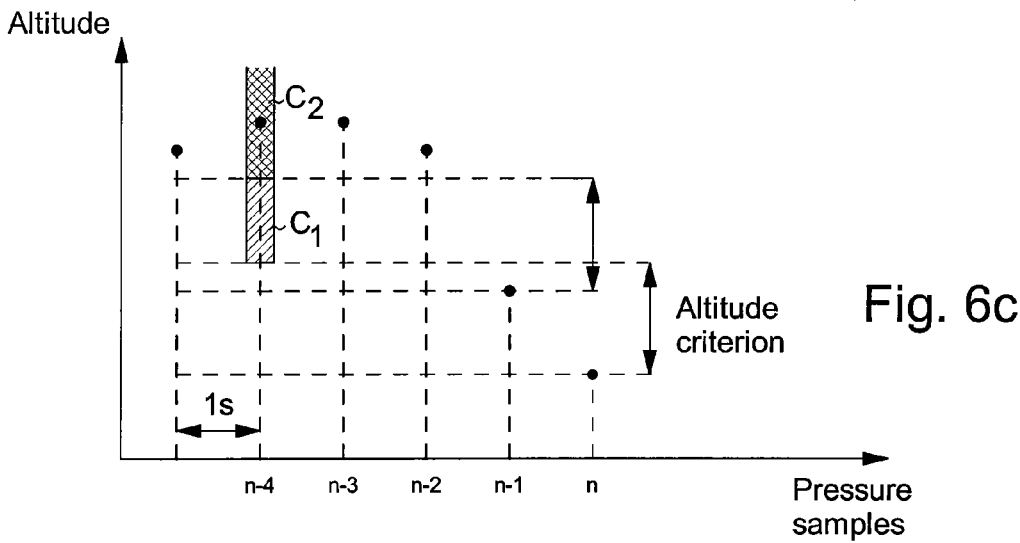

FIG. 6c shows the analysis of the second sample after the abrupt pressure variation. The first condition remains fulfilled, a second unrealistic altitude value having been calculated. Moreover, this time the second condition c2 is also fulfilled in that the altitude value used as a reference is the value corresponding to the preceding sample, i.e. the new value hn–1, formerly altitude value hn in FIG. 6b. Since both conditions c1 and c2 are fulfilled, the variation detector sends an automatic altimeter mode exit signal only two seconds after unrealistic altitude values have been calculated.

It will be understood that various alterations and/or improvements evident to those skilled in the art could be made to the altimeter mode exit method of the invention, and to the watch for implementing this method described hereinbefore, without departing from the scope of the invention defined by the annexed claims. In particular, as regards the analogue display means, various alternatives can be envisaged, including the use of hands other than those used for displaying the time, the use of a graduated disc or a mechanical counter, the calculated altitude appearing opposite an aperture or window made in the watch dial. As regards the pressure filter, one could envisage making a smoothed mean of only two pressure values, which has the advantage of having a more reactive altitude value as regards the measured pressure, or conversely, making a smoothed mean of four pressure values, which has the effect of making the altitude variations less abrupt and reducing any abrupt movements of the hands during significant variations in the measured pressure. However, this smoothed mean should not include more values to avoid completely smoothing the calculated altitude value, which could have the effect of preventing detection of inappropriate behaviour by the user in the altimeter mode and thus preventing an efficient exit from this mode.

What is claimed is:

1. A method allowing an electronic watch fitted with an altimeter mode to automatically exit said mode including the following steps:
   a) entry into altimeter mode by activating the watch altimeter module;
   b) using a pressure sensor of the watch to measure at least one first pressure value used to calculate a first altitude value;
   c) using the pressure sensor to measure at least one second pressure value used to calculate a second altitude value;
   e) comparing the difference between said first and second pressure or altitude values to a determined pressure or altitude variation threshold using a variation detector of the altimeter module;
   e) displaying the calculated altitude values by an analog display means;
   f) automatic exit from the altimeter mode when the result of the comparison is higher than the determined pressure or altitude variation threshold and stopping the display of altitude values by the analogue display means.

2. The method according to claim 1, wherein the determined variation threshold is higher than the altitude variation of a man in freefall.

3. The method according to claim 2, wherein the two altitude values considered are separated by 3 seconds and in that the altitude variation threshold selected is 300 meters.

4. The method according to claim 1, wherein a pressure filter is used at steps b) and c), the latter consisting in:
   b) using the pressure sensor of the watch to measure at least two first pressure values defining a first mean pressure value used for calculating a first altitude value;
   c) using the pressure sensor to measure at least two second pressure values defining a second mean pressure value used for calculating a second altitude value.

5. The method according to claim 1, wherein the pressure value measurements and altitude value calculations of steps b) and c) are repeated at a determined sampling frequency, in that step d) consists in the following two sub-steps:
   d1) comparing the difference between a previously calculated altitude value to the penultimate altitude value and the latter to a determined altitude variation threshold and d2) comparing the difference between said previously calculated altitude value to the penultimate calculated altitude value and the last calculated altitude value to the same determined altitude variation threshold;
   and in that step e) consists in automatically exiting the altimeter mode when the result of the two differences carried out in sub-steps d1) and d2) is higher than the determined altitude variation threshold and stopping the display of altitude values by the analogue display means.

6. The method according to claim 5, characterized in that the previously calculated altitude value used in sub-steps d1) and d2) is the fourth altitude value preceding the last calculated altitude value and wherein the altitude variation threshold is also selected to be 300 meters.

7. The method according to claim 5, wherein a pressure filter is used such that the calculation of each altitude value is based on the at least two previously measured pressure values, defining a mean pressure value.

8. The method according to claim 6, wherein a pressure filter is used such that the calculation of each altitude valve is based on the at least two previously measured pressure values, defining a mean, pressure value.

9. The method according to claim 1, wherein during step f) stopping the altitude value display consists in switching the analogue display means into time mode.

10. An electronic watch including a pressure sensor, an altimeter module calculating, in altimeter mode, altitude values from pressure values measured by said pressure sensor and analogue display means for displaying the calculated altitude values, wherein said altimeter module includes a variation detector which includes a subtracter receiving two pressure or, respectively altitude, values, and a comparator between the result provided at the output of the subtracter and a pressure or, respectively altitude, variation threshold, and further including mode selection means controlled by the variation detector output for automatically exiting the altimeter mode when the value of the difference between the two pressure or, respectively altitude, values is higher than the pressure or, respectively altitude, variation threshold and stopping the display of altitude values by the analogue display means.

11. The electronic watch according to claim 10, wherein the altimeter module further includes a pressure filter supplying mean pressure values to the variation detector.

12. The electronic watch according to claim 10, wherein the altimeter module further includes an altitude filter supplying mean altitude values to the variation detector.

* * * * *